United States Patent
Mandal et al.

(10) Patent No.: US 11,012,405 B2
(45) Date of Patent: May 18, 2021

(54) DISTRIBUTING ADDRESS RESOLUTION MESSAGES

(71) Applicant: Arista Networks, Inc., Santa Clara, CA (US)

(72) Inventors: Kallol Mandal, Sausalito, CA (US); Amit Dattatray Ranpise, San Jose, CA (US); Alton Lo, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/568,014

(22) Filed: Sep. 11, 2019

(65) Prior Publication Data

US 2021/0075759 A1    Mar. 11, 2021

(51) Int. Cl.
*H04L 29/12* (2006.01)

(52) U.S. Cl.
CPC ........ *H04L 61/103* (2013.01); *H04L 61/2514* (2013.01); *H04L 61/6022* (2013.01)

(58) Field of Classification Search
CPC .......... H04L 61/103; H04L 61/2514; H04L 61/6022
See application file for complete search history.

(56) References Cited

U.S. PATENT DOCUMENTS

| | | | | |
|---|---|---|---|---|
| 8,902,896 B2* | 12/2014 | Kamble | ............... | H04L 45/745 370/392 |
| 9,923,814 B2* | 3/2018 | Wan | ..................... | H04L 61/103 |
| 2003/0043853 A1* | 3/2003 | Doyle | ..................... | H04L 61/10 370/489 |
| 2003/0086390 A1* | 5/2003 | Eschbach | ............... | H04L 67/14 370/329 |
| 2003/0140283 A1* | 7/2003 | Nishio | ............. | H04L 29/12811 714/43 |
| 2004/0052216 A1* | 3/2004 | Roh | ..................... | H04L 61/2503 370/252 |
| 2006/0221979 A1* | 10/2006 | Cheshire | ........... | H04L 29/12028 370/395.54 |
| 2006/0245350 A1* | 11/2006 | Shei | ..................... | H04L 45/3065 370/216 |
| 2008/0175254 A1* | 7/2008 | Ho | ..................... | H04L 12/4641 370/395.53 |
| 2015/0081853 A1* | 3/2015 | Nicholson | ........... | H04L 61/2092 709/220 |
| 2015/0100784 A1* | 4/2015 | Ido | ............................ | H04L 9/32 713/168 |
| 2016/0087893 A1* | 3/2016 | Nedunchezhian | ..... | H04B 7/185 370/392 |

(Continued)

*Primary Examiner* — Jerry B Dennison
(74) *Attorney, Agent, or Firm* — Haley Guiliano LLP

(57) ABSTRACT

Systems and methods for handling an address resolution probe. An illustrative method includes receiving, at a first device on a network, an address resolution message from a second device on the network, determining whether the address resolution message is an address resolution probe message, and in response to determining that the address resolution message is an address resolution probe message, transmitting the address resolution message to a third device on the network regardless of whether a binding for a destination internet protocol (IP) address included in the address resolution message is stored in a bindings table accessible to the first device.

24 Claims, 9 Drawing Sheets

(56) References Cited

U.S. PATENT DOCUMENTS

| | | | |
|---|---|---|---|
| 2016/0173356 A1* | 6/2016 | Jiang | H04L 43/0817 |
| | | | 370/400 |
| 2016/0173441 A1* | 6/2016 | Lee | H04L 61/2092 |
| | | | 709/220 |
| 2016/0277440 A1* | 9/2016 | Thubert | H04L 61/6059 |
| 2016/0380893 A1* | 12/2016 | Chopra | H04L 43/12 |
| | | | 370/392 |
| 2018/0219773 A1* | 8/2018 | Li | G06F 9/45558 |
| 2019/0296972 A1* | 9/2019 | Brotherson | H04L 41/0853 |
| 2020/0169494 A1* | 5/2020 | K | H04L 43/0876 |
| 2020/0244623 A1* | 7/2020 | Zhang | H04L 12/4641 |
| 2020/0274847 A1* | 8/2020 | Kuo | H04L 61/103 |

\* cited by examiner

DISTRIBUTING ADDRESS RESOLUTION MESSAGES

BACKGROUND

The present disclosure relates to handling of address resolution messages in computer networks.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
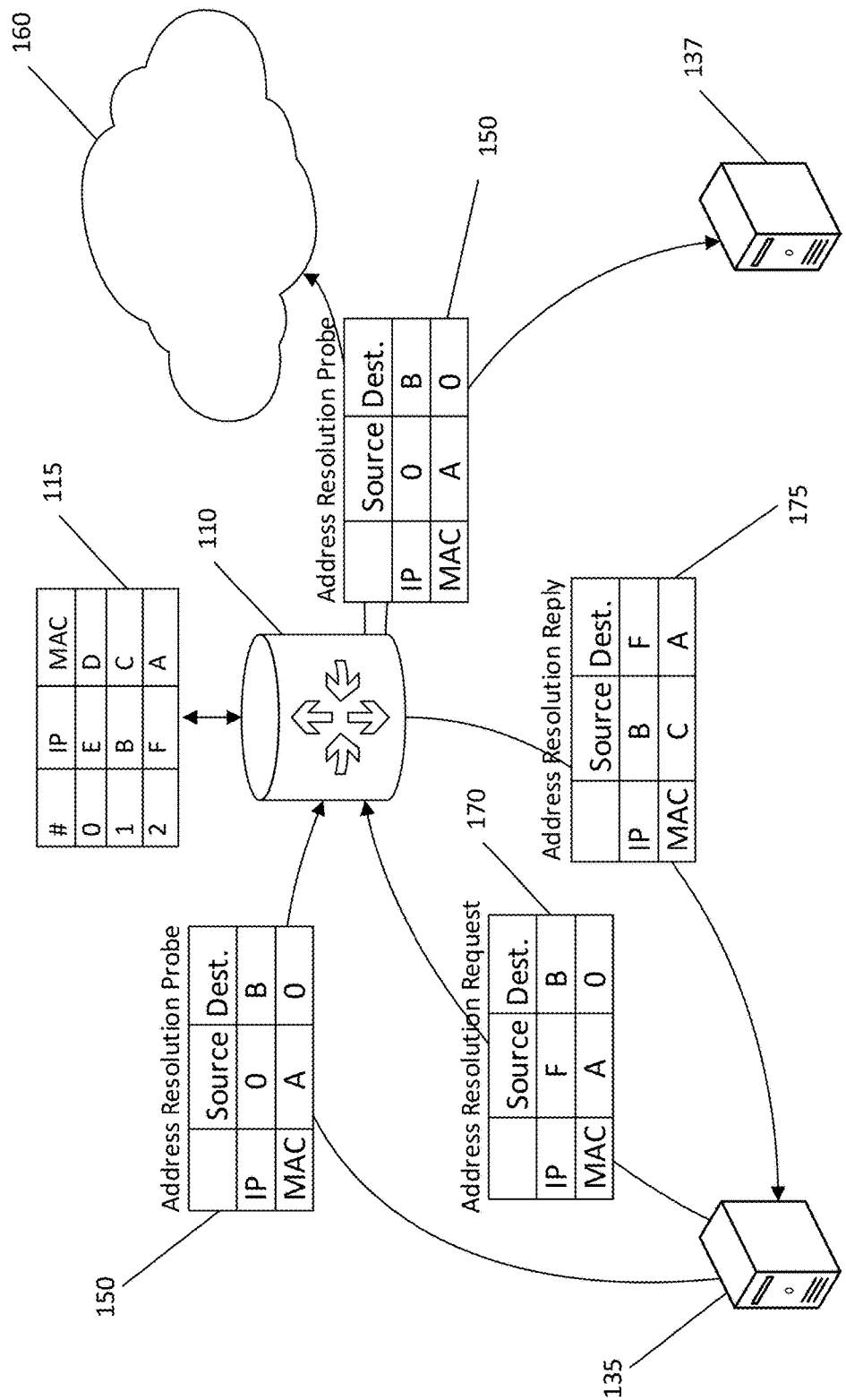
FIG. 1 shows an illustrative diagram of a process for handling an address resolution probe message, in accordance with some embodiments of the disclosure.

In some computer networks, devices use address resolution messages (e.g., address resolution protocol (ARP) messages or neighbor discovery protocol (NDP) messages) to determine a media access control (MAC) address of a device for which only the internet protocol (IP) address (e.g., IPv4 or IPv6) is known to the requestor. An address resolution message typically includes fields for two IP addresses and two MAC addresses—IP and MAC address fields for the source device (a source IP address and a source MAC address) and IP and MAC address fields for the destination device (a destination IP address and a destination MAC address). Address resolution messages have various types, including address resolution request messages and address resolution reply messages. Address resolution request messages also have a sub-type—address resolution probe messages. In address resolution request messages (e.g., ARP request messages or NDP neighbor solicitation messages), the source IP address field, the source MAC address field, and the destination IP address field include valid entries. The destination MAC address field is empty because that is the information being sought. In address resolution probe messages (e.g., ARP probe messages or NDP neighbor solicitation probe messages) the source MAC address field and the destination IP address field include valid entries, but the source IP address field and the destination MAC address field do not. Like address resolution request messages, address resolution probe messages seek to obtain a MAC address for the device having the destination IP address, but do so without conveying an IP address-to-MAC address binding (IP/MAC binding) of the source device. Thus, address resolution probe messages lack an entry in the source IP address field. A response to the address resolution probe message will still reach the source device because the source MAC address field of the address resolution probe message includes the MAC address of the source device.

When a requesting device transmits an address resolution request message including the IP address of a target device, each network device (e.g., routers or switches) connected to the requesting device receives the message and retransmits the message to the devices connected to them. This process repeats itself until all devices on the network (including the target device) have received the message. While network devices retransmit an address resolution request message that they receive, other devices (e.g., hosts) that are not the target device (i.e., devices that do not have the destination IP address included in the message) simply disregard (or filter out) the message. When the target device receives the message, the target device generates an address resolution reply message (e.g., an ARP reply message or a NDP neighbor advertisement message) including, as the source IP address and MAC address of the address resolution reply message, the IP address and MAC address of the target device, and as the destination MAC address of the address resolution reply message, the source MAC address that was included in the received address resolution request message. If the received address resolution request message includes a source IP address (and thus is not of the address resolution probe sub-type), the target device may further include, as the destination IP address of the address resolution reply message, the source IP address that was included in the received address resolution request message. The address resolution reply message is then transmitted back to the requesting device.

Some network devices may be configured to function as proxies for address resolution messages. The network devices maintain bindings tables (e.g., ARP tables or NDP tables) indicating the IP/MAC bindings known to the network devices. The network devices maintain such tables based on IP/MAC bindings included in address resolution messages received by the network devices. In ethernet virtual private networks (EVPNs), network devices may also use IP/MAC bindings included in route advertisements (e.g., EVPN update messages) received by the network devices to maintain the bindings tables. Entries for IP/MAC bindings in the bindings tables typically have an expiration, that is, the entries expire (or time out) after a predetermined period of time unless a new address resolution message (or route advertisement) including the IP/MAC binding is received. When a network device receives an address resolution request message, the network device determines whether its bindings table includes an entry for an IP address included as the destination IP address of the address resolution request message. If the network device's bindings table does not include an entry for the destination IP address, the network device relays (or retransmits) the address resolution request message to other devices on the network. Alternatively, if the network device's bindings table does include an entry for the destination IP address, the network device does not relay the address resolution request message. Instead, the network device generates an address resolution reply message including, as the source IP address and source MAC address of the address resolution reply message, the IP/MAC binding of the entry (in the bindings table) for the destination IP address that was included in the address resolution request message and transmits the generated address resolution reply message to the device identified by the source MAC address of the address resolution request message. An address resolution reply message may thus be generated and transmitted to the requesting device without an address resolution request message ever reaching the target device.

Such proxying creates a potential for incorrect address resolution reply messages to be generated. For example, if the bindings table of the network device includes an incorrect or outdated IP/MAC binding for the destination IP address included in the address resolution request message, the network device will generate an address resolution reply message with the incorrect or outdated IP/MAC binding without the address resolution request message ever reaching the target device. The target device will thus not have the opportunity to provide its correct IP/MAC binding to the requesting device.

Proxying also creates a potential for false-positive address resolution reply messages (e.g., address resolution reply messages that should not be transmitted) to be generated. For example, if the bindings table of the network device includes an unexpired binding for a host that has gone offline, the network device will respond to an address resolution request message by generating and transmitting an address resolution reply message including the binding for the host that has gone offline to the requesting device. The requesting device will thus not be able to determine whether the target device is offline based on receiving the address resolution reply message, because the message was generated and transmitted by the network device and not the target device. In some approaches, the period during which an entry in the bindings table is valid before it expires is longer than the amount of time a requesting device will wait for a response to an address resolution request message before determining that the target device is offline (or that the destination IP address is not in use on the network). Thus, if the network device (operating as an address resolution proxy) generates an address resolution reply message in response to receiving an address resolution request message including a destination IP address of a device that has gone offline, but whose IP address is included in a not-yet-expired entry in the network device's bindings table, the address resolution reply message generated by the network device is a false positive. The requesting device may thus receive one or more false positive address resolution reply messages before the IP/MAC binding for the offline device expires in the bindings table of the network device, thereby delaying the requesting device from determining that the target device is offline.

Various systems and methods described herein address these problems by configuring network devices to always relay (and thus not serve as address resolution proxies for) address resolution messages that are of a particular type and/or that match a particular format. In particular, network devices are configured to always relay (or retransmit) address resolution probe messages regardless of whether the network devices' bindings tables include an entry for an IP/MAC binding including the destination IP address included in the address resolution probe message. The network devices determine whether an address resolution message is an address resolution probe message by determining whether the source IP address included in the address resolution message is all-zero or another predetermined value. When the network devices determine that the address resolution message is an address resolution probe message, the network devices refrain from searching their bindings tables for the destination IP address included in the address resolution probe message, and instead relay (or retransmit) the address resolution probe message to the other devices to which the network devices are connected. A requesting device is thus given the option to generate an address resolution request message when the requesting device can rely on the accuracy of the information in a network device's bindings table, or to generate an address resolution probe message when the requesting device needs an address resolution reply message to come from only the target device.

In addition to the above-described benefits, some of the embodiments described herein enable address resolution probe messages to be used to determine whether a device is active (e.g., online) on the network. For example, address resolution probe messages may be transmitted to devices on a network to determine whether a particular IP address is assigned to a device on the network. If a device having the particular IP address receives the address resolution probe message, the device generates an address resolution reply message including its IP/MAC binding to transmit to the requesting device to announce that the device having the particular IP address is active on the network.

In some networks, some host devices (e.g., servers) that provide important resources or functionality to the network have standby (i.e., backup or redundant) devices configured to replace the hosts if the hosts go offline. In such networks, a standby device (e.g., a standby host) is configured to assume a virtual internet protocol (VIP) address of a primary device for which it serves as backup when the primary device goes offline. This allows other devices on the network to continue sending network traffic to the same IP address when the standby device has replaced the primary device.

The standby device assumes the VIP address of the primary device when the standby device determines that the primary device is offline. In order for the standby device to make that determination, the standby device periodically transmits an address resolution probe message with the VIP address as the destination IP address and the standby device's MAC address as the source MAC address. If the standby device does not receive a response to the address resolution probe message within a predetermined amount of time after transmitting the address resolution probe message, the standby device determines that the primary device is offline, and the standby device assumes the VIP address of the primary device. Alternatively, if the standby device receives a response to the address resolution probe message, the standby device determines that the primary device is online, and the standby device waits a predetermined amount of time before transmitting another address resolution probe message.

Various systems and methods described herein for configuring network devices to always relay (and thus not serve as address resolution proxies for) address resolution probe messages ensure that the standby device can rely on the reception of an address resolution reply message to determine that the primary device is online. Likewise, various systems and methods described herein prevent prolonged outages of network resources that can be caused by delays in the standby device assuming the VIP address as a result of receiving false positive address resolution reply messages. This is due to the network devices always retransmitting an address resolution probe message regardless of whether the network devices' bindings tables include an IP/MAC binding for the destination IP address included in the address resolution probe message.

FIG. 1 shows an illustrative diagram of a process for handling an address resolution probe message. In particular, FIG. 1 shows a network device 110 receiving an address resolution message 150 and an address resolution request message 170 from a host 135. Network device 110 includes a bindings table 115 (e.g., an ARP table and/or a NDP table) stored in storage 308 (described below with reference to FIG. 3A). Bindings table 115 includes entries for IP/MAC bindings that are known to network device 110. In particular, as shown in FIG. 1, bindings table 115 includes an entry "0" for an IP address "E" and a MAC address "D," an entry "1" for an IP address "B" and a MAC address "C," and an entry "2" for an IP address "F" and a MAC address "A." Address resolution message 150 includes a source IP address field, a source MAC address field, a destination IP address field, and a destination MAC address field. As shown in FIG. 1, the source IP address field of address resolution message 150 includes an entry "0," the source MAC address field includes an entry "A," the destination IP address field includes an entry "B," and the destination MAC address field includes an entry "0." An entry of "0," as shown in FIG. 1, is indicative of either an all-zero address (e.g., an unspecified address) or empty field, or an invalid entry. For example, an all-zero IPv4 address may be 0.0.0.0, and an all-zero IPv6 address may be 0:0:0:0:0:0:0:0. Likewise, an all-zero (or unspecified) MAC address may be 00:00:00:00:00:00 and/or 11:11:11:11:11:11. Those skilled in the art will appreciate that these examples are merely illustrative and that various other unspecified and/or invalid addresses may be used with the systems and methods described herein without departing from the scope of the present disclosure.

Bindings table 115 includes an entry for the destination IP address (i.e., "B") included in the address resolution message 150 (i.e., entry "1" for IP address "B" and MAC address "C"). As described further below with reference to FIGS. 4A and 4B, network device 110, upon receiving address resolution message 150, determines whether address resolution message 150 is an address resolution probe message. For example, as described further below with reference to FIG. 5, network device 110 extracts the entry in the source IP address field of address resolution message 150, determines whether the entry is an all-zero, unspecified, or otherwise invalid entry, and if that is true, determines that address resolution message 150 is an address resolution probe message. If network device 110 determines that address resolution message 150 is an address resolution probe message, network device 110 refrains from determining whether bindings table 115 includes an entry for the destination IP address included in address resolution message 150 (which, as shown in FIG. 1, is true because the IP address in entry 1 of bindings table 115 matches the destination IP address in address resolution message 150), and relays or retransmits address resolution message 150 to other devices connected to network device 110 (e.g., a host 137 and various other devices represented by network 160).

FIG. 1 further shows an example of the process followed by network device 110 when an address resolution message 170 is not an address resolution probe message. For example, as shown in FIG. 1, address resolution message 170 includes the same fields as address resolution message 150, but instead of having an entry of "0" in the source IP address field, address resolution message 170 includes an entry "F" in its source IP address field. When network device 110 receives address resolution message 170 and extracts the entry in the source IP address field of address resolution message 170, network device 110 determines that the entry is not "0," and thus that address resolution message 170 is not an address resolution probe message. Network device 110 then searches bindings table 115 for an entry including IP address "B," (which, as shown in FIG. 1, is entry "1" in bindings table 115). In response to identifying the MAC address bound to the IP address "B," network device 110 generates and transmits an address resolution reply message 175 to host 135. As shown in FIG. 1, address resolution reply message 175 includes the same fields as address resolution messages 150 and 170 and has an entry "B" in the source IP address field, an entry "C" in the source MAC address field, an entry "F" in the destination IP address field, and an entry "A" in the destination MAC address field.

Figure 2:
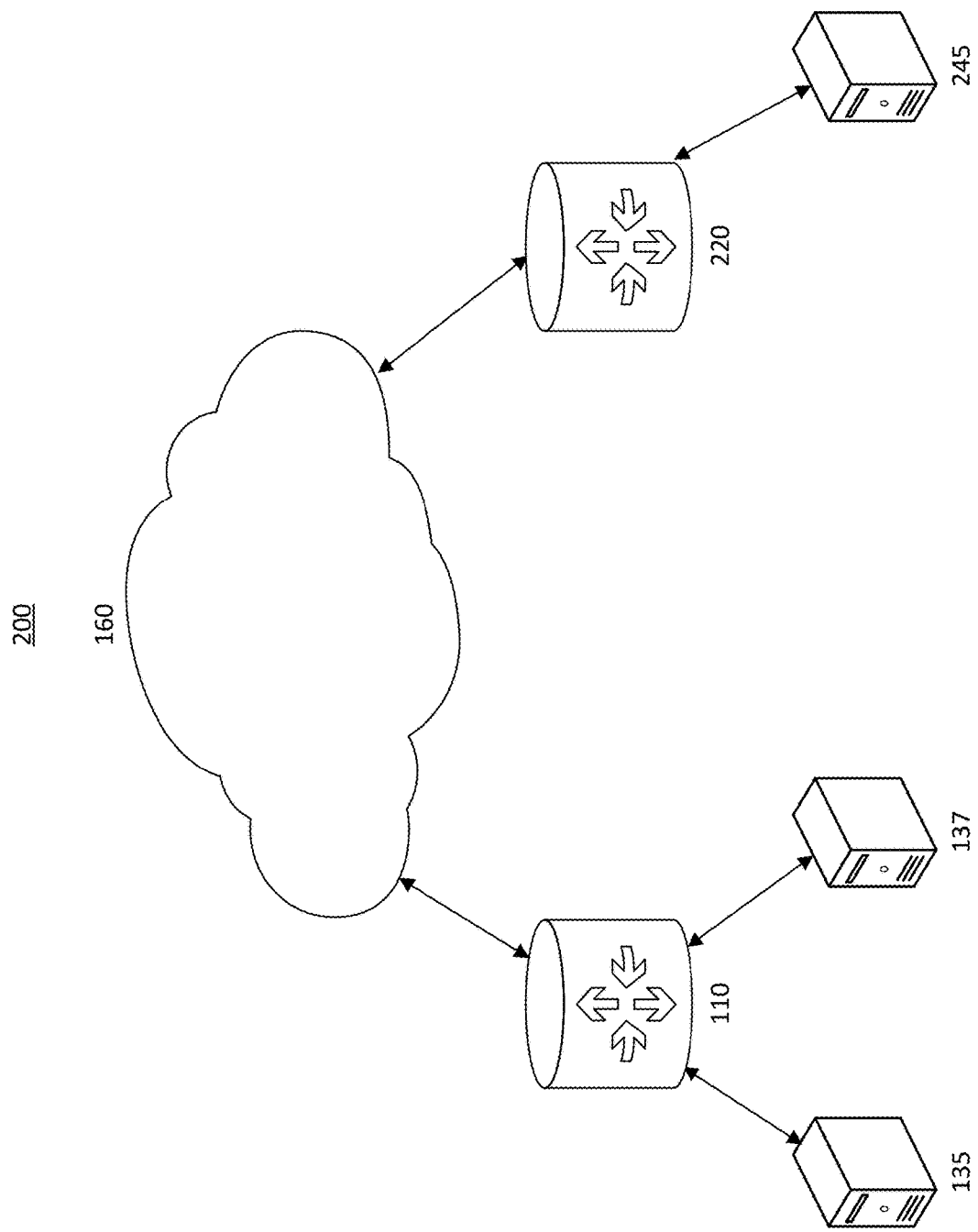
FIG. 2 shows an illustrative network topology of a system for handling an address resolution probe message, in accordance with some embodiments of the disclosure.

FIG. 2 shows an illustrative network topology of a system for handling an address resolution probe message, according to some embodiments of the present disclosure. In particular, FIG. 2 shows a network topology 200 including network device 110, host 135, host 137, and network 160 mentioned above with regard to FIG. 1. Network topology 200 further includes a network device 220 and a host 245. Network devices 110 and 220 may be a router, a switch, and/or any other network device configured to receive network traffic from a first device and forward the network traffic to a second device, such as by performing an address lookup in a bindings table. Network device 220, as well as other network devices not shown in FIG. 2, may include a bindings table similar to bindings table 115 of FIG. 1. Host 135 may be a standby (i.e., backup or redundant) device for host 245. Host 245 may thus be a primary device providing important resources or functionality to host 137 and/or other devices on network 160. In particular, host 135 may be configured to assume a VIP address of host 245 when host 245 goes offline in order for other devices (e.g., host 137) on the network to be able continue to send network traffic to the same VIP address even though that VIP address was transferred to a different device (e.g., from host 245 to host 135).

Continuing the example described above with reference to FIG. 1, host 135 may send address resolution message 150 having a destination IP address entry corresponding to a VIP address of host 245. Network device 110 receives address resolution message 150 from host 135, determines that address resolution message 150 is an address resolution probe message, and relays (or retransmits) address resolution message 150 to host 137 and to various other devices to which network device 110 are connected (not shown in FIG. 2), as represented by network 160. Because host 137 does not have the IP address included in the destination IP address field of address resolution message 150, host 137 disregards address resolution message 150.

Other network devices (not shown in FIG. 2) in the data path between network devices 110 and 220 similarly receive address resolution message 150, determine that address resolution message 150 is an address resolution probe message, and relay (or retransmit) address resolution message 150 to other network devices to which those network devices are connected. Network device 220 receives address resolution message 150 either directly from network device 110 or indirectly as relayed via other network devices in the data path between network device 110 and network device 220. When network device 220 receives address resolution message 150, network device 220 determines that address resolution message 150 is an address resolution probe message, and relays (or retransmits) address resolution message 150 to host 245 (if host 245 is online).

If host 245 is online, host 245, which has a VIP address corresponding to the IP address included in the destination IP address field of address resolution message 150, generates an address resolution reply message including the IP and MAC addresses in the source IP and MAC address fields of the address resolution reply message, and includes the MAC address of host 135, which was included in the source MAC address field of address resolution message 150, in the destination MAC address field of the address resolution reply message. Host 245 then transmits the address resolution reply message to network device 220, which forwards the address resolution reply message along the data path to network device 110, which ultimately transmits the address resolution reply message to host 135.

If host 245 is not online, network device 220 will not transmit address resolution message 150 to host 245 (or network device 220 may attempt to transmit address resolution probe message 150 to host 245, but address resolution message 150 will not reach host 245). Network device 220 will not generate any response to address resolution message 150. Instead, host 135 will simply not receive a response (i.e., an address resolution reply message) to address resolution message 150, and, after waiting a predetermined amount of time to receive the response, will determine that host 245 is offline. In some embodiments, the predetermined amount of time that host 135 waits before determining that host 245 is offline is shorter than the timeout period for an entry in the bindings table (i.e., the amount of time an entry in bindings table 115 is valid before the entry expires).

While FIG. 2 shows network topology 200 as including only two network devices (i.e., network devices 110 and 220) connected via network 160, those skilled in the art will appreciate that there may be various other network devices (not shown in FIG. 2) in a data path between network device 110 and network device 220. Further, each of network devices 110 and 220, as well as other network devices in network 160 and/or in a data path between network device 110 and network 160 (or between network device 220 and network 160) may be connected to various other network devices (not shown in FIG. 2) that are not in a data path between network devices 110 and 220, and any of the aforementioned network devices may be connected to various other hosts (not shown in FIG. 2).

Figure 3A:
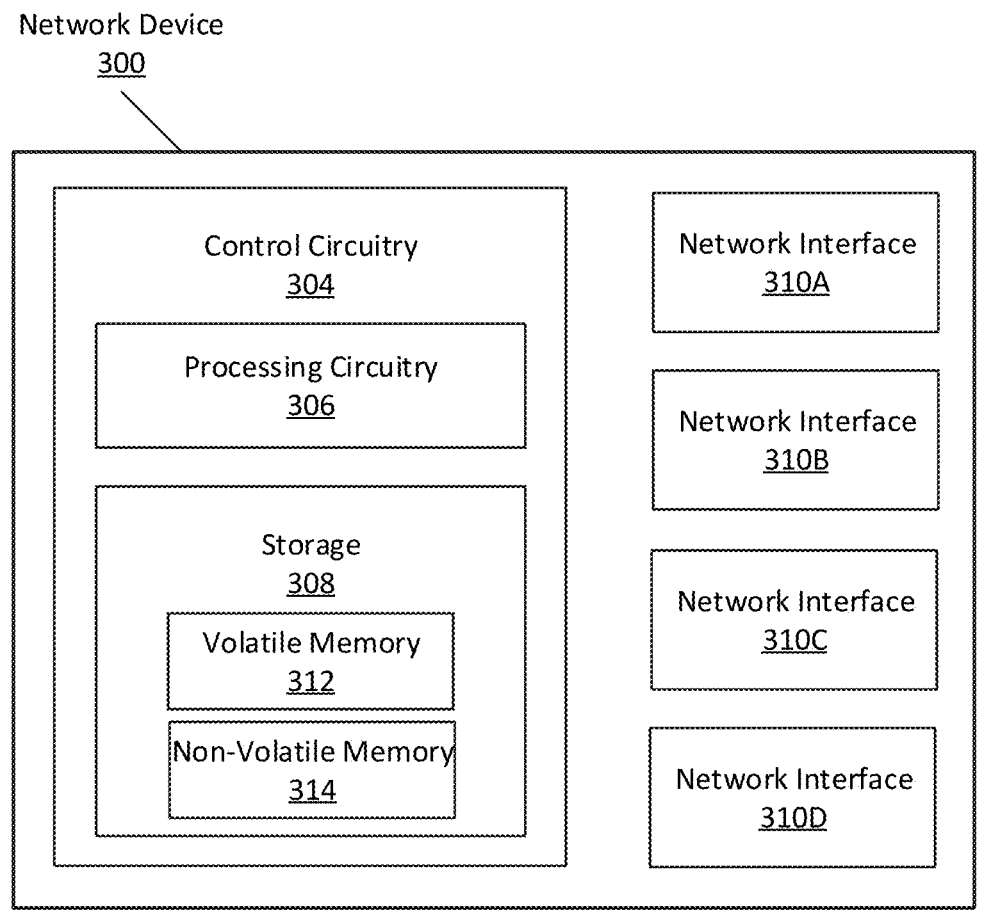
FIG. 3A shows a diagram of an illustrative network device of the system of FIG. 2, in accordance with some embodiments of the disclosure.

FIG. 3A shows a generalized embodiment of a network device 300. As depicted, network device 300 may be a router, a switch, and/or any other network device configured to receive network traffic from a first device and forward the network traffic to a second device, such as by performing an address lookup in a bindings table. Those skilled in the art will recognize that network devices 110 and 220 of FIGS. 1 and 2 may be implemented as network device 300. Network device 300 may receive network traffic (e.g., address resolution message 150) via a network interface (e.g., network interface 310A), and provide the network traffic to control circuitry 304, which includes processing circuitry 306 and storage 308. While network device 300 is shown as including four network interfaces (e.g., network interfaces 310A, 310B, 310C, and 310D), this is merely illustrative, and those skilled in the art will appreciate that network device 300 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for determining whether address resolution message 150 corresponds to an address resolution probe standard, as described further below with reference to FIG. 5. Control circuitry 304 may further transmit address resolution message 150 to other devices connected to network device 300.

Storage 308 may include volatile random-access memory (RAM) 312, which does not retain its contents when power is turned off, and non-volatile RAM 314, which does retain its contents when power is turned off. In some embodiments, storage 308 may be an electronic storage device that is part of control circuitry 304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, bindings table 115 is stored in storage 308. In other embodiments, bindings table 115 may be stored on a separate device and a link to bindings table 115 may be stored in storage 308. The circuitry described herein may execute instructions included in software running on one or more general purpose or specialized processors. Multiple circuits may be provided to handle simultaneous processing functions.

Figure 3B:
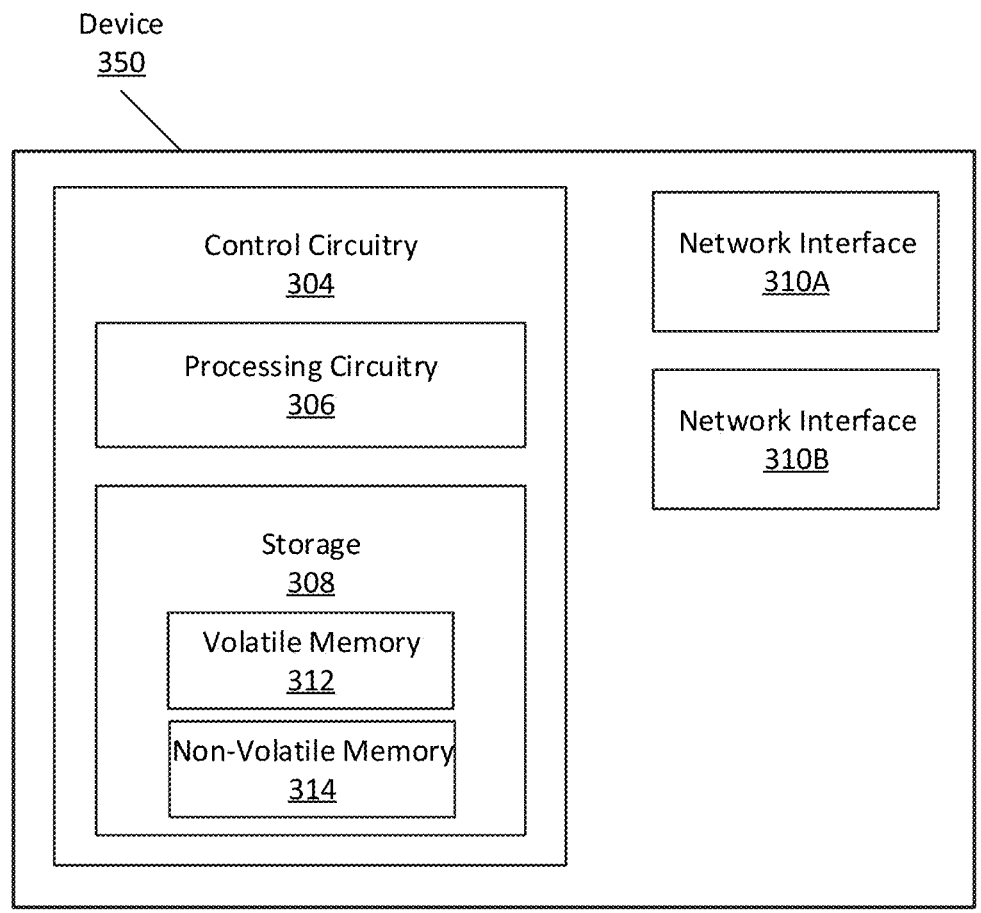
FIG. 3B shows a diagram of an illustrative host device of the system of FIG. 2, in accordance with some embodiments of the disclosure.

FIG. 3B shows a generalized embodiment of a device 350. As depicted, device 350 may be a host, such as a server and/or any other device on a network that can be configured to assume a VIP address of another device on the network when that other device goes offline. Those skilled in the art will recognize that hosts 135, 137, and 245 of FIGS. 1 and 2 may be implemented as device 350. Similar to network device 300, device 350 includes control circuitry 304, which includes processing circuitry 306 and storage 308, and one or more network interfaces (depicted as network interfaces 310A and 310B). Storage 308 may include volatile memory 312 and non-volatile memory 314. The structure and/or function of these components, having been described above with reference to FIG. 3A, are not being described again for the purpose of brevity.

Figure 4A:
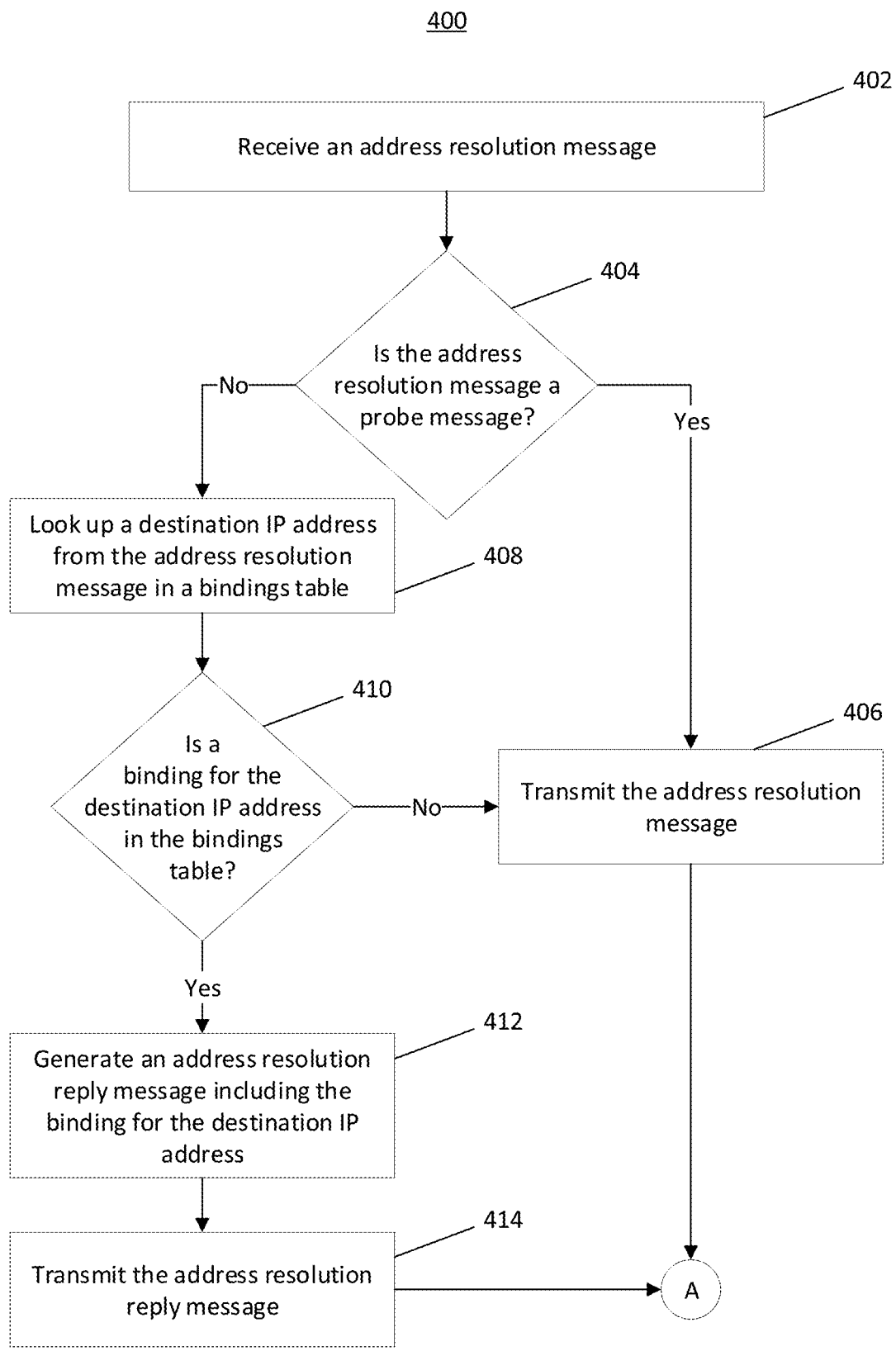
FIG. 4A shows a flowchart of an illustrative process for handling an address resolution probe message, in accordance with some embodiments of the disclosure.

FIGS. 4A and B show a flowchart of an illustrative process for handling an address resolution probe message, in accordance with some embodiments of the disclosure. A process 400 for handling an address resolution probe message, such as address resolution message 150 of FIG. 1, may begin at block 402, where control circuitry, such as control circuitry 304 of network device 300 (FIG. 3A), receives an address resolution message (i.e., address resolution message 150). Address resolution message 150 may originate at host 135 and be destined for host 245 and may have been relayed via one or more other network devices (such as network devices 110 and/or 220) before reaching control circuitry 304, via a network interface (e.g., network interface 310A), of network device 300.

At block 404, control circuitry 304 determines whether the address resolution message received at block 402 (e.g., address resolution message 150) is an address resolution probe message. For example, control circuitry 304 determines whether address resolution message 150 is an ARP request message in an ARP probe format, or is a NDP neighbor solicitation message in a NDP neighbor solicitation probe format. The ARP probe format or NDP neighbor solicitation probe format may be a format or syntax according to which ARP probe messages or NDP neighbor solicitation probe messages are generated (or coded), and via which an ARP probe message or NDP neighbor solicitation probe message may be distinguished from other address resolution messages, such as ARP request messages and/or NDP neighbor solicitation messages). For example, the ARP probe format or NDP neighbor solicitation probe format may require that a source IP address field of the address resolution message be empty or have an unspecified or invalid entry. The process for determining whether an address resolution message is an address resolution probe message is further described below with reference to FIG. 5. In response to determining that the address resolution message received at block 402 (e.g., address resolution message 150) is an address resolution probe message, process 400 proceeds to block 406. In response to determining that the address resolution message received at block 402 (e.g., address resolution message 170) is not an address resolution probe message, and thus is an address resolution request message, process 400 proceeds to block 408.

At block 406, control circuitry 304 transmits the address resolution message received at block 402 to another device. For example, control circuitry 304 transmits address resolution message 150 to host 137, host 245, and/or other devices included in network 160.

At block 408, control circuitry 304 looks up an IP address, which was included in a destination IP address field of the address resolution message received at block 402, in a bindings table. For example, control circuitry 304 uses the IP address, which was included in the destination IP address field of the address resolution message received at block 402, as a key to search a bindings table (e.g., bindings table 115 stored in storage 308 or a bindings table stored on a separate device that is accessible to network device 300) for an entry for that IP address.

At block 410, control circuitry 304 determines whether a binding (e.g., an IP/MAC binding) for the IP address, which was included in the destination IP address field of the address resolution message received at block 402, is included in the bindings table. For example, control circuitry 304 determines whether the search of bindings table 115, as performed at block 408, yielded an entry for the IP address that was included in the destination IP address field of the address resolution message received at block 402. In response to determining that the bindings table does not include an entry for the IP address included in the destination IP address field of the address resolution message received at block 402, process 400 returns to block 406. In response to determining that the bindings table includes an entry for the IP address included in the destination IP address field of the address resolution message received at block 402, process 400 proceeds to block 412.

At block 412, control circuitry 304 generates an address resolution reply message including the binding for the IP address included in the destination IP address field of the address resolution message received at block 402. For example, control circuitry 304 extracts the IP and MAC addresses included in the entry from bindings table 115 identified at block 408 and generates an address resolution reply message including the extracted IP address in a source IP address field, and the extracted MAC address in a source MAC address field. Control circuitry 304 further extracts IP and MAC addresses from the source IP address field and source MAC address field of the address resolution message received at block 402, and includes, as the destination IP address and destination MAC address of the address resolution reply message, the extracted source IP address and extracted MAC address, respectively.

At block 414, control circuitry 304 transmits the address resolution reply message. For example, control circuitry 304 transmits the address resolution reply message generated at block 412 to a device (e.g., host 135) having the MAC address included in the source MAC address field of the address resolution message received at block 402.

At block 416, control circuitry 304 receives an address announcement message. For example, control circuitry 304 receives an address announcement message, such as a gratuitous address resolution message (e.g., a gratuitous ARP request, gratuitous ARP reply, and/or a gratuitous NDP neighbor advertisement message), from host 135. The address announcement message may include a new IP/MAC binding for the IP address that was included in the destination IP address field of the address resolution message received at block 402. The address announcement message may have been generated by host 135 to announce to the network that host 135 has assumed the VIP address that was formerly assigned to host 245.

At block 418, control circuitry 304 determines whether the bindings table includes an entry for an IP address included in a source IP address field of the address announcement message received at block 416. For example, control circuitry 304 uses the IP address, which was included in the source IP address field of the address announcement message received at block 416, as a key to search bindings table 115 for an entry for that IP address. Control circuitry 304 may further determine whether the search of bindings table 115 yielded an entry for the IP address that was included in the source IP address field of the address announcement message received at block 416. In response to determining that the bindings table does not include an entry for the IP address included in the source IP address field of the address announcement message received at block 416, process 400 proceeds to block 420. In response to determining that the bindings table does include an entry for the IP address included in the source IP address field of the address announcement message received at block 416, process 400 proceeds to block 422.

At block 420, control circuitry 304 adds an entry for the source IP address and source MAC address, included in the address announcement message, to the bindings table. For example, control circuitry 304 generates an entry for bindings table 115, the entry including the IP address and MAC address included in the source IP address field and source MAC address field, respectively, of the address announcement message received at block 416.

At block 422, control circuitry 304 determines whether a MAC address included in the entry is the same as a MAC address included in a source MAC address field of the address announcement message. For example, control circuitry 304 compares the MAC address included in the entry of bindings table 115 identified at block 418 with the MAC address included in the source MAC address field of the address announcement message received at block 416, and determines whether the compared MAC addresses are the same (e.g., whether the MAC addresses match). In response to determining that the MAC address included in the entry is not the same as the MAC address included in the source MAC address field of the address announcement message, process 400 proceeds to block 424. In response to determining that the MAC address included in the entry is the same as the MAC address included in the source MAC address field of the address announcement message, process 400 ends.

At block 424, control circuitry 304 updates the entry with the source MAC address included in the address announcement message. For example, control circuitry 304 replaces the MAC address included in the entry identified at block 418 with the MAC address included in the source MAC address field of the address announcement message received at block 416.

Figure 5:
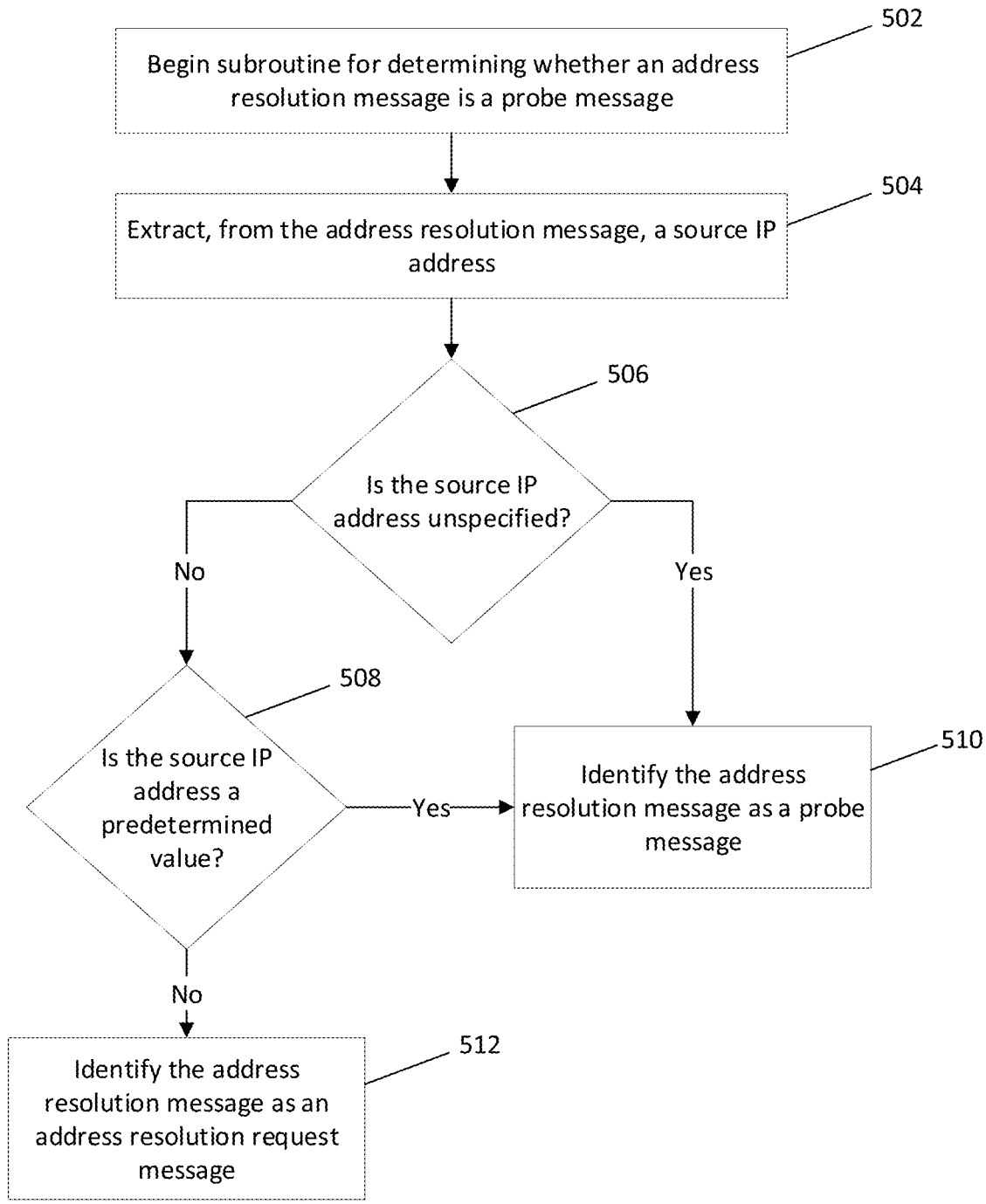
FIG. 5 is a flowchart of a detailed illustrative process for determining whether an address resolution message is an address resolution probe message, in accordance with some embodiments of the disclosure.

FIG. 5 is a flowchart of a detailed illustrative process for determining whether an address resolution message is an address resolution probe message, in accordance with some embodiments of the disclosure. A process 500 for determining whether an address resolution message is an address resolution probe message may begin at block 502, where control circuitry, such as control circuitry 304 of network device 300 (FIG. 3A) extracts, from an address resolution message, a source IP address. For example, control circuitry 304 extracts an IP address from a source IP address field included in the address resolution message received at block 402 (FIG. 4A).

At block 504, control circuitry 304 determines whether the source IP address is unspecified. For example, control circuitry 304 determines whether the IP address extracted at block 502 is an unspecified value (e.g., an all-zero value such as 0.0.0.0 or 0:0:0:0:0:0:0:0) or the source IP address field of the address resolution message received at block 402 was empty. In response to determining that the source IP address is not unspecified, process 500 proceeds to block 506. Alternatively, in response to determining that the source IP address is unspecified, process 500 proceeds to block 508, where control circuitry 304 identifies the address resolution message as an address resolution probe message.

At block 506, control circuitry 304 determines whether the source IP address is a predetermined value. For example, control circuitry 304 determines whether the IP address extracted at block 502 is a predetermined value that is designated as an invalid value. In some embodiments, control circuitry 304 may retrieve a list of invalid values from storage 308 or another device in the network and determine whether the IP address extracted at block 502 matches one of the invalid values. In response to determining that the source IP address is not a predetermined value, process 500 proceeds to block 510, where control circuitry 304 identifies the address resolution message as an address resolution request message.

Figure 6:
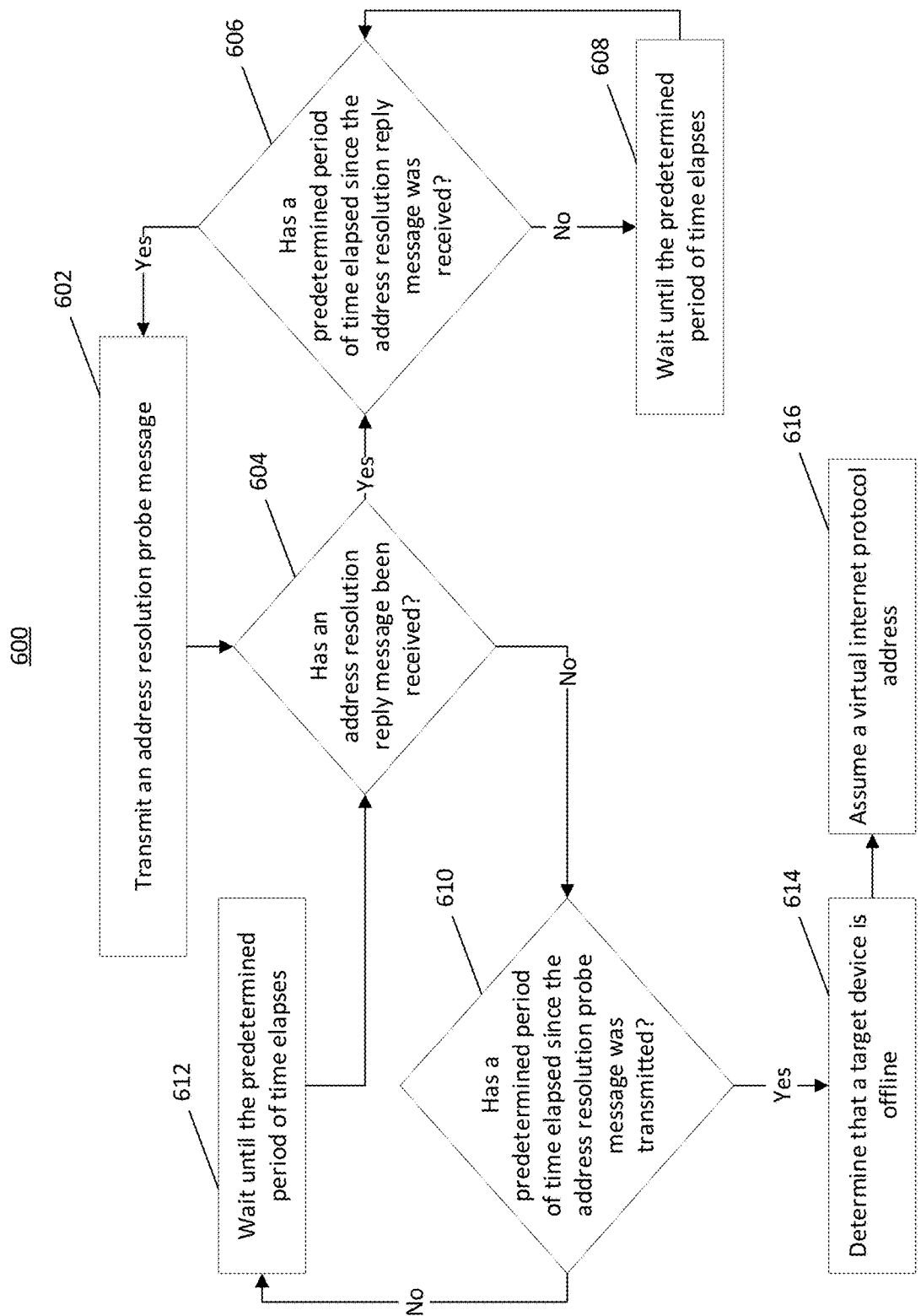
FIG. 6 shows a flowchart of an illustrative process for assuming a network address in response to not receiving an address resolution reply message, in accordance with some embodiments of the disclosure.

FIG. 6 shows a flowchart of an illustrative process for assuming a network address in response to not receiving an address resolution reply message, in accordance with some embodiments of the disclosure. Process 600 begins at block 602, where control circuitry, such as control circuitry 304 of device 350 (FIG. 3B), transmits an address resolution probe message (e.g., address resolution message 150 of FIG. 1). As noted above, address resolution message 150 includes entries in a source MAC address field and a destination IP address field. Control circuitry 304 may transmit address resolution message 150, via a network interface (e.g., network interface 310A of FIG. 3B) to a network device (e.g., network device 110), which in turn retransmits address resolution message 150 with the goal to reach a target device (e.g., server 245) having the IP address included in the destination IP address field of address resolution message 150, according to the process described above with reference to FIGS. 4A and 4B.

At block 604, control circuitry 304 determines whether an address resolution reply message has been received in response to the address resolution probe message transmitted at block 602. For example, control circuitry 304 may monitor network traffic received via network interface 310A to determine whether a data packet received via network interface 310A is an address resolution reply message including, in its source IP address field, the VIP address that was included in the destination IP address field of the address resolution probe message transmitted at block 602. In response to determining that an address resolution reply message in response to the address resolution probe message has been received, process 600 proceeds to block 606. In response to determining that an address resolution reply message in response to the address resolution probe message has not been received, process 600 proceeds to block 610.

At block 606, control circuitry 304 determines whether a predetermined period of time has elapsed since the address resolution reply message was received at block 604. For example, control circuitry 304 may be configured to wait a predetermined period of time (e.g., a few seconds) after receiving an address resolution reply message before transmitting another address resolution probe message. If the predetermined period of time has not elapsed since the address resolution reply message was received at block 604, process 600 proceeds to block 608, where control circuitry 304 waits until the predetermined period of time has elapsed before returning to block 606. Alternatively, if the predetermined period of time has elapsed since the address resolution reply message was received at block 604, process 600 returns to block 602, where control circuitry 304 transmits a new address resolution probe message.

At block 610, control circuitry 304 determines whether a predetermined period of time has elapsed since the address resolution probe message was transmitted at block 602. For example, control circuitry 304 may be configured to wait a predetermined period of time (e.g., a few seconds) after transmitting an address resolution probe message before determining that the target device (i.e., the device having the VIP address that was included in the destination IP address field of the address resolution probe message transmitted at block 602) is offline or unreachable. If the predetermined period of time has not elapsed since the address resolution probe message was transmitted at block 602, process 600 proceeds to block 612, where control circuitry 304 waits until the predetermined period of time has elapsed before returning to block 604. Alternatively, if the predetermined period of time has elapsed since the address resolution probe message was transmitted at block 602, process 600 proceeds to block 614, where control circuitry 304 determines that the target device is offline or unreachable.

Thereafter, at block 616, control circuitry 304 assumes the VIP address that was included in the destination IP address field of the address resolution probe message transmitted at block 602. For example, control circuitry 304 may configure network interface 310A to use the VIP address.

Figure 4B:
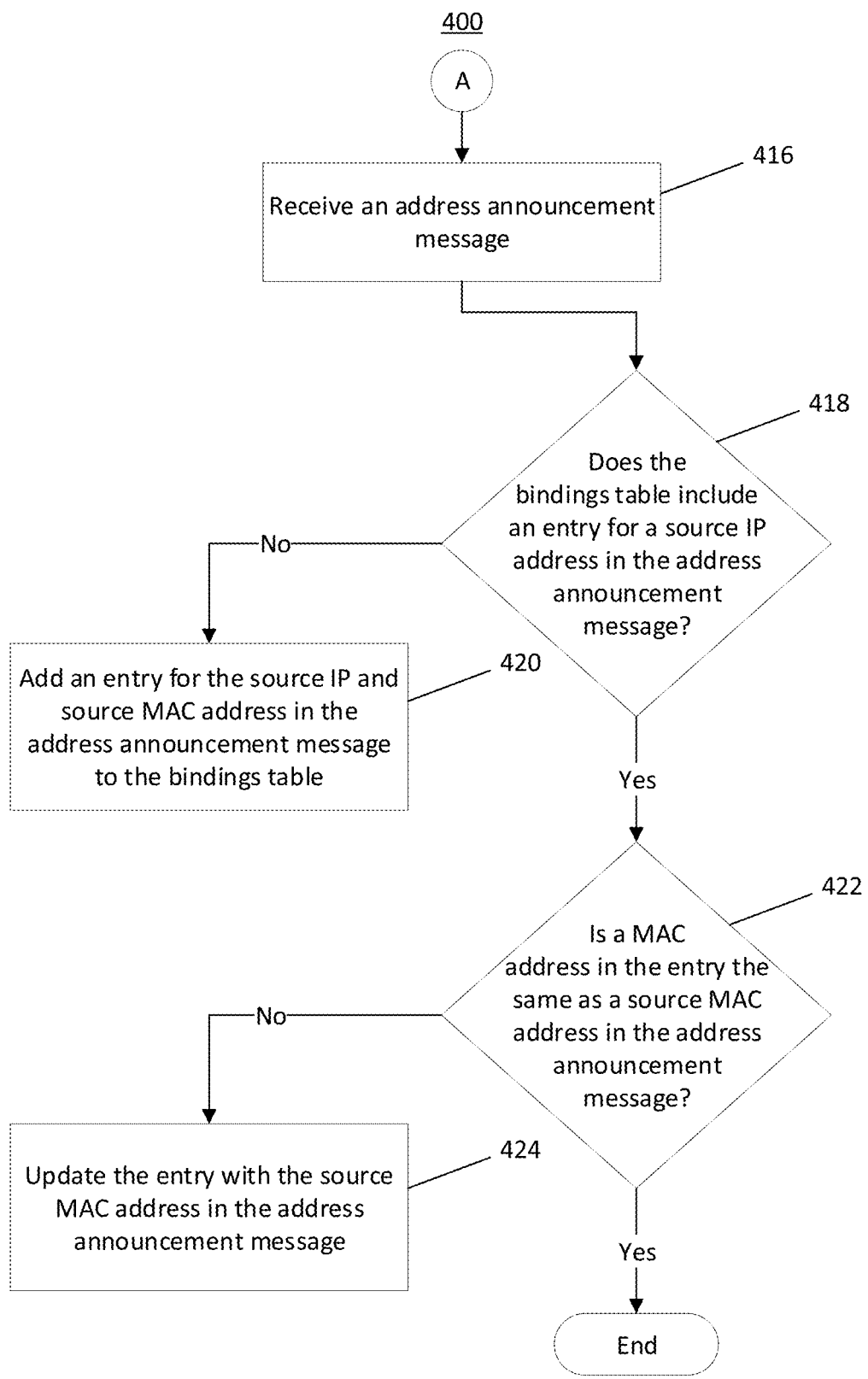
FIG. 4B shows additional aspects of the illustrative process of FIG. 4A, in accordance with some embodiments of the disclosure.
Figure 7:
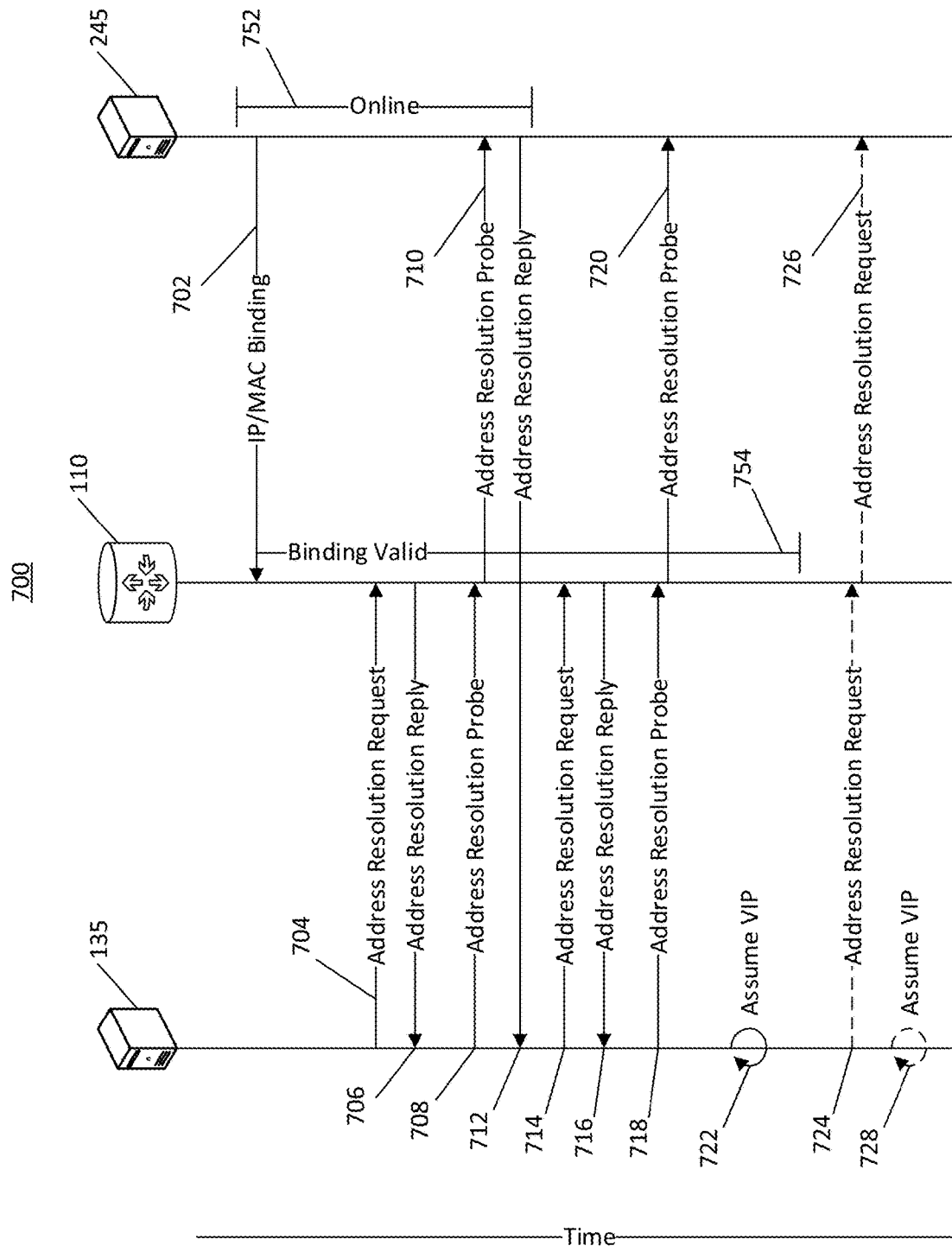
FIG. 7 shows a sequence diagram illustrating a timing of some of the aspects of FIGS. 4A, 4B, and 6, in accordance with embodiments of the disclosure.

FIG. 7 shows a sequence diagram illustrating a timing of some of the aspects of FIGS. 4A, 4B, and 6, in accordance with embodiments of the disclosure. In particular, FIG. 7 shows the different operations that are performed by network device 110 in response to receiving an address resolution probe message as opposed to receiving an address resolution request message, and how this difference in operation enables a standby device (e.g., host 135) to more quickly assume a VIP address of a primary device (e.g., host 245).

As shown in FIG. 7, a primary device (e.g., host 245) comes online and provides its IP/MAC binding to a network device (e.g., network device 110) at 702. Primary device 245 may provide its IP/MAC binding to network device 110 directly, or via one or more other intervening network devices (not shown in FIG. 7). Primary device 245 remains online for a time period 752 before going offline. Network device 110 stores the IP/MAC binding received from primary device 245 in a bindings table, and the entry remains valid for a time period 754.

During time period 752, if, at 704, network device 110 receives, from standby device 135, an address resolution request message including the IP address received from primary device 245 at 702, network device 110 will operate as an address resolution proxy and generate an address resolution reply message including the IP/MAC binding for primary device 245, and transmit the address resolution reply message to standby device 135 at 706. In comparison, if, at 708, network device 110 receives, from standby device 135, an address resolution probe message including the IP address received from primary device 245 at 702, network device 110 will not operate as an address resolution proxy and will instead retransmit the address resolution probe message at 710. Upon receiving the address resolution probe message including its IP address, primary device 245 generates and transmits, to standby device 135, an address resolution reply message at 712. Thus, while primary device 245 is online, the result of transmitting an address resolution request message or an address resolution probe message is the same—an address resolution reply message will be transmitted to standby device 135.

After time period 752 (i.e., after primary device 245 goes offline), but before time period 754 passes (i.e., before the entry for the IP/MAC binding received at 702 expires) the difference in the operation of network device 110 in response to address resolution request messages as opposed to address resolution probe messages becomes apparent. While an address resolution request message received by network device 110 at 714 will yield the same result (i.e., the generation and transmission, at 716, of an address resolution reply message including the IP/MAC binding received at 702), an address resolution probe message received by network device 110 at 718, and retransmitted by network device 110 at 720, will not result in the generation or transmission of an address resolution reply message, because primary device 245 is offline. Thus, standby device 135 is able to determine, after waiting a predetermined period of time for an address resolution reply message, that primary device 245 is offline, and in response, standby device 135 assumes the VIP address of primary device 245 more quickly.

After time period 754 expires, the result of transmitting an address resolution request message and an address resolution probe message will again be the same because then the entry for the IP/MAC binding received at 702 has expired, and network device 110 will no longer operate as an address resolution proxy for that IP/MAC binding. For example, if network device 110 receives an address resolution request message at 724, network device 110 will retransmit that address resolution request message at 726. Standby device 135 will not receive an address resolution reply message in response to the address resolution request message transmitted at 724 because primary device 245 is offline, so standby device 135 will be able to determine that primary device 245 is offline and assume the VIP address at 728. However, there may be a significant delay between assuming the VIP address at 728 as opposed to assuming the VIP address at 722, particularly if time period 754 is much longer than the period of time standby device 135 waits to receive an address resolution reply message before determining that primary device 245 is offline.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for configuring a network interface with a virtual internet protocol address, the method comprising:

transmitting an address resolution message including, as a destination internet protocol address, a virtual internet protocol address, wherein a network device, upon receiving the address resolution message, determines that the address resolution message is an address resolution probe message and retransmits the address resolution message to another device regardless of whether a binding for the virtual internet protocol address is stored in a bindings table accessible to the network device;

determining whether an address resolution reply message has been received, the address resolution reply message including, as a source internet protocol address, the virtual internet protocol address;

in response to determining that the address resolution reply message has not been received, determining whether a period of time has elapsed since the address resolution message was transmitted, wherein the period of time is shorter than a period of time for which the binding for the virtual internet protocol address stored in the bindings table is valid; and in response to determining that the period of time has elapsed, configuring a network interface with the virtual internet protocol address.

2. The method of claim 1, wherein the configuring the network interface with the virtual internet protocol address comprises configuring the network interface with the virtual internet protocol address while the binding for the virtual internet protocol address stored in the bindings table is valid.

3. A system for configuring a network interface with a virtual internet protocol address, the system comprising:
- a network interface configured to transmit an address resolution message including, as a destination internet protocol address, a virtual internet protocol address, wherein a network device, upon receiving the address resolution message, determines that the address resolution message is an address resolution probe message and retransmits the address resolution message to another device regardless of whether a binding for the virtual internet protocol address is stored in a bindings table accessible to the network device; and
- control circuitry configured to:
- determine whether an address resolution reply message has been received, the address resolution reply message including, as a source internet protocol address, the virtual internet protocol address;
- in response to determining that the address resolution reply message has not been received, determine whether a period of time has elapsed since the address resolution message was transmitted, wherein the period of time is shorter than a period of time for which the binding for the virtual internet protocol address stored in the bindings table is valid; and
- in response to determining that the period of time has elapsed, configure the network interface with the virtual internet protocol address.

4. The system of claim 3, wherein the control circuitry is configured to configure the network interface with the virtual internet protocol address by configuring the network interface with the virtual internet protocol address while the binding for the virtual internet protocol address stored in the bindings table is valid.

5. A method for handling an address resolution probe, the method comprising:
- receiving, at a first device on a network, an address resolution message from a second device on the network;
- determining whether the address resolution message is an address resolution probe message;
- in response to determining that the address resolution message is an address resolution probe message, transmitting the address resolution message to a third device on the network regardless of whether a binding for a destination internet protocol (IP) address included in the address resolution message is stored in a bindings table accessible to the first device; and
- in response to determining that an address resolution reply message has not been received from the third device, determining whether a period of time has elapsed since the address resolution message was transmitted to the third device, wherein the period of time is shorter than a period of time for which the binding for the virtual internet protocol address stored in the bindings table is valid.

6. The method of claim 5, wherein determining whether the address resolution message is an address resolution probe message comprises determining that a data entry in a predetermined field of the address resolution message corresponds to a predetermined value.

7. The method of claim 6, wherein determining that the data entry in the predetermined field of the address resolution message corresponds to the predetermined value comprises determining that the data entry is all-zero.

8. The method of claim 5, wherein determining whether the address resolution message is an address resolution probe message comprises determining whether a source IP address included in the address resolution message is all-zero.

9. The method of claim 8, further comprising, in response to determining that the source IP address is all-zero, refraining from searching for a binding for the destination IP address in the bindings table.

10. The method of claim 5, further comprising:
- receiving a message including a binding of the destination IP address to a source media access control (MAC) address included in the address resolution message; and
- adding the binding included in the message to the bindings table accessible to the first device.

11. The method of claim 10, wherein the received message comprises a gratuitous message from the second device to convey an IP address-to-MAC address binding.

12. The method of claim 10, wherein the received message comprises at least one of a gratuitous address resolution protocol (ARP) reply message, a gratuitous ARP request message, or an unsolicited neighbor advertisement message.

13. The method of claim 5, wherein the address resolution message comprises at least one of an ARP request message in an ARP probe format or a neighbor discovery protocol (NDP) neighbor solicitation message in a NDP neighbor solicitation probe format.

14. The method of claim 5, wherein the bindings table comprises at least one of an ARP bindings table or a NDP bindings table.

15. A system for handling an address resolution probe, the system comprising:
- a network interface of a first device on a network, the network interface configured to receive an address resolution message from a second device on the network; and
- control circuitry configured to:
- determine whether the address resolution message is an address resolution probe message;
- in response to determining that the address resolution message is an address resolution probe message, transmit the address resolution message to a third device on the network regardless of whether a binding for a destination internet protocol (IP) address included in the address resolution message is stored in a bindings table accessible to the first device; and
- in response to determining that an address resolution reply message has not been received from the third device, determine whether a period of time has elapsed since the address resolution message was transmitted to the third device, wherein the period of time is shorter than a period of time for which the binding for the virtual internet protocol address stored in the bindings table is valid.

16. The system of claim 15, wherein the control circuitry is configured to determine whether the address resolution message is an address resolution probe message by determining that a data entry in a predetermined field of the address resolution message corresponds to a predetermined value.

17. The system of claim 16, wherein the control circuitry is configured to determine that the data entry in the predetermined field of the address resolution message corresponds to the predetermined value by determining that the data entry is all-zero.

18. The system of claim 15, wherein the control circuitry is configured to determine whether the address resolution message is an address resolution probe message by determining whether a source IP address included in the address resolution message is all-zero.

19. The system of claim 18, wherein the control circuitry is further configured to, in response to determining that the source IP address is all-zero, refrain from searching for a binding for the destination IP address in the bindings table.

20. The system of claim 15, wherein the control circuitry is further configured to:
receive a message including a binding of the destination IP address to a source media access control (MAC) address included in the address resolution message; and
add the binding included in the message to the bindings table accessible to the first device.

21. The system of claim 20, wherein the received message comprises a gratuitous message from the second device to convey an IP address-to-MAC address binding.

22. The system of claim 20, wherein the received message comprises at least one of a gratuitous address resolution protocol (ARP) reply message, a gratuitous ARP request message, or an unsolicited neighbor advertisement message.

23. The system of claim 15, wherein the address resolution message comprises at least one of an ARP request message in an ARP probe format or a neighbor discovery protocol (NDP) neighbor solicitation message in a NDP neighbor solicitation probe format.

24. The system of claim 15, wherein the bindings table comprises at least one of an ARP bindings table or a NDP bindings table.

\* \* \* \* \*